US012600562B2

(12) United States Patent
Kling et al.

(10) Patent No.: US 12,600,562 B2
(45) Date of Patent: Apr. 14, 2026

(54) WASTE BIN ARRANGEMENT

(71) Applicant: Essity Hygiene and Health Aktiebolag, Gothenburg (SE)

(72) Inventors: Robert Kling, Gothenburg (SE); Karl Walheim, Borlänge (SE); Per Möller, Borlänge (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

(21) Appl. No.: 18/290,091

(22) PCT Filed: May 12, 2021

(86) PCT No.: PCT/EP2021/062713
§ 371 (c)(1),
(2) Date: Nov. 9, 2023

(87) PCT Pub. No.: WO2022/237982
PCT Pub. Date: Nov. 17, 2022

(65) Prior Publication Data

US 2024/0278986 A1 Aug. 22, 2024

(51) Int. Cl.
*B65F 1/08* (2006.01)

(52) U.S. Cl.
CPC .......... *B65F 1/08* (2013.01); *B65F 2210/181* (2013.01)

(58) Field of Classification Search
CPC ........ B65F 1/1646; B65F 1/0013; B65F 1/08; B65F 2210/181; B65F 1/12; B65F 2240/1568; B65F 2003/0279; B65D 3/14
See application file for complete search history.

(56) References Cited

U.S. PATENT DOCUMENTS 1,011,762 A * 12/1911 Doolan ..................... B62B 1/24 248/129
3,063,591 A * 11/1962 Laginestra ................ B65F 1/12 100/255
(Continued)

FOREIGN PATENT DOCUMENTS

AT 504229 A2 * 4/2008 ................ B65F 1/16
CH 699164 B1 1/2010
(Continued)

OTHER PUBLICATIONS

International Search Report for International Application No. PCT/EP2021/062713; International Filing Date: May 12, 2021; Date of Mailing: Feb. 14, 2022; 4 pages.
(Continued)

*Primary Examiner* — Kareen K Thomas
(74) *Attorney, Agent, or Firm* — CANTOR COLBURN LLP

(57) ABSTRACT

Kit of parts for fitting a waste bin with a waste basket, comprising: a hinge element, the hinge element being arranged for being attached to the waste bin, a waste basket, the waste basket comprising a waste receptacle for retaining waste, the waste receptacle having apertures extending through a wall of the waste receptacle to allow for air to circulate between the inside and the outside of the waste receptacle, wherein the hinge element and the waste basket are arranged so that the waste basket can be releasably rotatably supported by the hinge element.

22 Claims, 7 Drawing Sheets

(56) References Cited

U.S. PATENT DOCUMENTS

| | | | | | |
|---|---|---|---|---|---|
| 3,195,272 | A * | 7/1965 | Mosher | A01G 9/026 | 220/4.24 |
| 4,002,382 | A * | 1/1977 | Wolf | A47B 46/00 | 433/79 |
| 5,096,080 | A * | 3/1992 | Penny | C05F 17/907 | D34/1 |
| 5,598,942 | A * | 2/1997 | Cowie | B65F 1/06 | 220/495.08 |
| 5,984,134 | A * | 11/1999 | Mario | B65F 1/06 | 220/495.11 |
| 6,311,859 | B1 * | 11/2001 | Haas | B65F 1/1607 | 220/628 |
| 6,732,880 | B1 * | 5/2004 | Nash, Sr. | B65F 1/04 | 220/495.11 |
| 6,991,127 | B2 * | 1/2006 | Huang | B65F 1/163 | 220/908 |
| 7,654,443 | B1 * | 2/2010 | Fuller | B65F 1/068 | 220/908 |
| 7,896,183 | B2 * | 3/2011 | McKenzie | B65F 1/068 | 220/908 |
| 9,283,649 | B2 * | 3/2016 | Seyanagi | B29C 44/38 | |
| 9,944,460 | B2 * | 4/2018 | Hon | B65D 43/262 | |
| 10,604,341 | B2 * | 3/2020 | Walker | B65F 1/16 | |
| 12,258,208 | B2 * | 3/2025 | Han | B65F 1/1426 | |
| 2004/0164077 | A1 * | 8/2004 | Kuo | B65F 1/163 | 220/263 |
| 2006/0283863 | A1 * | 12/2006 | Coles | B65F 1/1415 | 220/495.08 |

FOREIGN PATENT DOCUMENTS

| | | | |
|---|---|---|---|
| CN | 202848472 | U | 4/2013 |
| CN | 207060996 | U | 3/2018 |
| CN | 208292007 | U | 12/2018 |
| DE | 3438753 | A1 | 7/1985 |
| DE | 8907754 | U1 | 11/1989 |
| DE | 20000886 | U1 | 4/2000 |
| ES | 2031728 | T3 | 12/1992 |
| FR | 2861710 | A1 | 5/2005 |

OTHER PUBLICATIONS

Written Opinion for International Application No. PCT/EP2021/062713; International Filing Date: May 12, 2021; Date of Mailing: Feb. 14, 2022; 8 pages.

Chinese Application No. 202180097268.X; Office Action with English translation dated Jul. 17, 2025; 23 pages.

National Intellectual Property Administration (CNIPA) of the People's Republic of China, Application No. 202180097268.X, mailed Dec. 22, 2025, with English Translation, 41 pages.

* cited by examiner

WASTE BIN ARRANGEMENT

CROSS REFERENCE TO RELATED APPLICATIONS

This application is a National Stage Application of PCT/EP2021/062713, filed May 12, 2023, which is incorporated by reference in its entirety herein.

TECHNICAL FIELD

The present invention relates to kits of parts for fitting an existing waste bin with a waste basket and for mounting a waste basket to a wall. It also relates to a method of making a waste basket, to a waste bin that is fitted with a waste basket and to a waste basket as such.

TECHNICAL BACKGROUND

Waste bins are ubiquitous in everyday life. They can be found almost everywhere, from private homes to train stations and from surgical theatres to public restrooms.

In such waste bins, there is generally a receptacle for receiving waste which is equipped therein with a bin liner. Any waste products that are left in that waste bin will be retained by the bin liner which can then be removed and disposed of.

Waste bins are usually designed so that an easy access to the bag is achieved. A solution to that problem is to have an openable waste bin, having a back part and an openable front part. The openable front part can be opened sidewise, meaning a rotation around the vertical hinge arrangement along one of the sides of the bin. Alternatively, when pulling the upper front part of the waste bin, the opening of the front may be achieved by a horizontal rotation about a bottom portion.

However, a growing concern has been caused by the fact that such bin liners are typically made of plastic. Such plastic is difficult to recycle, and the accumulation of plastic particles in the world's oceans is a matter of grave environmental concern. Therefore, a need exists to provide waste baskets that do not require bin liners. Ideally, such waste baskets should also allow for a retro-fitting of existing waste bins with such waste baskets since frequently, owners of such waste bins do not want to replace existing waste bins and would rather fit them with a more environmentally friendly waste basket.

Another concern arises when shipping kits for fitting waste baskets. Frequently, the waste baskets are manufactured in one place and are then to be shipped to the end user. Since a typical waste basket surrounds, with its waste receptacle, an empty space, it is rather bulky to send. Accordingly, a large amount of packaging is required, which is expensive both from the point of view of making such a packaging as well as from a shipping perspective since the efficiency of space usage is rather low. Accordingly, a need exists to improve the efficiency of space usage in sending kits of parts for fitting waste bins with waste baskets.

SUMMARY OF THE INVENTION

The present invention has been made in view of these problems and aims to alleviate or even solve some of them.

The invention is defined by the independent claims. Preferred embodiments are set out in the respective dependent claims.

According to claim 1, a kit of parts for fitting a waste bin with a waste basket is provided. Such a kit of parts can thus be used for adapting an already existing waste bin so as to hold a waste basket which is to be described further below.

This kit of parts comprises a hinge element which is suitable for being attached to the waste bin. It could, for example, be screwed to the waste bin. Alternatively, it could also be clipped, wedged in or adhered to the waste bin. Further ways of adhering the hinge element to the waste bin can be envisaged by the skilled person.

The kit of parts furthermore comprises a waste basket which comprises a waste receptacle for retaining waste. This waste receptacle comprises apertures that extend through a wall of the waste receptacle. Those apertures allow for air to circulate between the inside and the outside of the waste receptacle. Therefore, if, for example, wet paper tissues, such as those that occur when drying the hands after washing them in a bathroom, are left inside the waste receptacle, they can dry whilst being retained inside the waste receptacle. Accordingly, it is less likely that mold will grow inside such a waste basket, so that the hygiene is improved. Further, since the contents of the waste receptacle are more hygienic, it is no longer necessary to use, for hygienic reasons, a bin liner, thereby allowing for a more environmentally friendly waste bin. It is to be noted that the waste receptacle typically has the shape of a bucket, i.e. a hollow tube that is closed at one end only whilst leaving the other end open.

The hinge element and the waste basket are both configured so that the waste basket can be releasably and rotatably supported by the hinge element. Accordingly, when the hinge element is attached to the waste bin, it can support the waste basket and can allow for rotating the waste basket out of the waste bin to thereby empty it. It is also possible that in an appropriate configuration, the waste basket can be released from the hinge element and can thus be tipped into, for example, a larger waste container which is then used for disposing of the waste.

It is preferred that the waste basket comprises a ring that is at least partially and preferably completely arranged along a periphery of an upper edge of the waste receptacle. The upper edge could be arranged so as to surround the opening of the waste receptacle. Such a ring stabilises the waste basket.

It is preferred that the ring comprises a first engagement piece and the hinge element comprises a second engagement piece. The first and the second engagement pieces are arranged so that they can be brought into releasable engagement with one another so as to allow the waste basket to be swivelled relative to the hinge element. With this configuration, it becomes possible to stably swivel the waste basket relative to the waste bin. This implies in particular if the ring is arranged in an upper part of the waste basket since thereby, the waste basket's centre of gravity will be below the engagement point between the first engagement piece and the second engagement piece, thereby stabilising the support of the waste basket by the hinge element.

It is preferred that the first engagement piece comprises a recess or a through-hole and that the second engagement piece comprises a protrusion. The recess/through-hole and the protrusion can be brought into engagement with one another to thereby allow for a swivelling support. Having such first and second engagement pieces makes those pieces easy to manufacture.

It is preferred that the hinge element and the waste basket allow for a swivelling motion of the waste basket around a vertical axis. Such an axis for the swivelling motion is particularly useful and makes it less likely that the waste basket will accidentally tip forward, which would lead to its contents being dispersed.

Alternatively, it is also possible that the hinge element and the waste basket allow for a swivelling motion of the waste basket along a horizontal axis. This makes emptying the waste basket easier since one can simply swivel it sufficiently far around the horizontal axis to allow for the contents of the waste basket to fall out.

In that context, it is preferred that the hinge element comprises a shaft element that is to be arranged in the waste bin, for example by means of a fixed attachment of the shaft element to the waste bin. The waste basket comprises a recess that is arranged for receiving the shaft element so as to allow for the swivelling motion of the waste basket around the horizontal axis, with the recess preferably being arranged in a bottom portion of the waste basket. By the bottom portion, the lower 50% of the length of the waste basket along the axial direction are meant, preferably the lower 20% of the length of the waste basket along the axial direction. Having such a configuration improves the stability of the waste basket that is fitted to the waste bin.

It is further preferred that the kit of parts comprises a tray that is suitable for being arranged underneath the waste receptacle. This tray could hold small waste that falls out of the apertures as well as liquids that may drip from the waste basket. Accordingly, having such a tray, which can be also removed from the waste bin, improves the overall hygiene since it can be removed from the waste bin and can then be cleaned.

In that context, it is preferred that the waste basket further comprises a third engagement piece and the tray comprises a fourth engagement piece. The third and the fourth engagement pieces are arranged for being brought into engagement with each other to then serve to support and/or limit the swivelling movement of the waste basket about the hinge element. Having such third and fourth engagement pieces serves to further stabilise and/or limit the swivelling movement of the waste basket about the hinge element.

According to another aspect of the invention, a waste bin arrangement comprises a waste bin that is fitted with the kit as defined previously. The hinge element is attached to the waste bin and rotatably supports the waste basket.

It is also preferred in that context that the tray is removably held in the waste bin and is preferably held underneath the waste basket. In that configuration, the waste tray can receive liquids dripping from the waste basket and can also receive any small objects falling through the apertures of the waste receptacle. Since the tray is removably held in the waste bin, it can be cleaned rather easily.

In that context, it is preferred that third and fourth engagement pieces of the tray and of the waste basket are engaged with one another, which leads to the advantages recited previously.

According to another aspect of the invention, a kit of parts for mounting a waste basket to a wall is provided.

This kit of parts comprises a frame that is arranged for attachment to a wall which comprises a hinge element. Similarly, to what was described previously, there is a waste basket which comprises a waste receptacle for retaining waste. The waste receptacle has apertures extending through a wall of the waste receptacle to allow for air to circulate between the inside and the outside of the waste receptacle. The hinge element and the waste basket are arranged so that the waste basket can be releasably rotatably supported by the hinge element.

With such a kit of parts, it becomes possible to mount a waste basket to a wall, which gives more flexibility in using the waste basket. The further advantages are analogous to those recited for the previously defined kits of parts.

Likewise, for the dependent claims 14-19, advantages analogous to those recited for the corresponding previous claims are achieved.

According to another aspect of the invention, a method of making waste baskets suitable for use in a kit or waste bin arrangement according to one of the preceding claims comprises firstly a step of providing a sidewall sheet having apertures extending therethrough. Subsequently, the sidewall sheet is bent and made to form a tube using the bent sidewall sheet as at least part of a sidewall of the tube.

Subsequently, a bottom element is used to close one end of the tube to thereby create a waste basket. Since, accordingly, the sidewall sheet is not provided in a tubular form, at least initially, and is only bent into that form, such a method allows for using a much more space efficiently shippable kit for making waste basket. It is to be noted that there can be several ways in which the bottom element can close the one of the tube. For example, the bottom element can be clipped to the tube. It is also possible that it will be fixed by screws or adhesive patched. It is also envisaged that the bottom element has a plastic edge that has provided therein a narrow recess which can receive the edge of the tube and can be form fitted so as to retain the bottom element in place.

It is preferred that the bottom element comprises a sheet having apertures extending therethrough. Also, such a sheet allows for the circulation of air and for any liquids to drip out of the waste basket and will thus avoid an accumulation of liquid inside the waste basket. As explained previously, this improves overall hygiene.

It is preferred that this method step of forming the tube comprises a sub-step of additionally providing a plate that is engaged to the edges of the sidewall sheet. Having such a plate, which is then used for holding the sidewall sheet in a bent shape to thus form the tube, stabilises the shape of the tube. This applies in particular if the plate has corrugations which improve the flexural rigidity of the plate. However, in most circumstances, the plate is flat overall.

It is preferred if the bottom element is provided as one component with the plate which makes manufacturing and shipping easier since fewer components need to be assembled. Likewise, the sidewall sheet can be provided as one element with the plate and can be connected to the plate using a living hinge, as is the case for the bottom element.

The method furthermore preferably comprises the step of attaching a ring to the open end of the tube so that the ring extends along the circumference of the tube. As explained previously, a thus manufactured waste basket is more stable.

In a preferred variant of that waste basket, there is further provided a ring that is arranged to extend along the circumference of the tube. As pointed out before, this ring stabilises the tube.

DETAILED DESCRIPTION OF THE DRAWINGS

Figure 1:
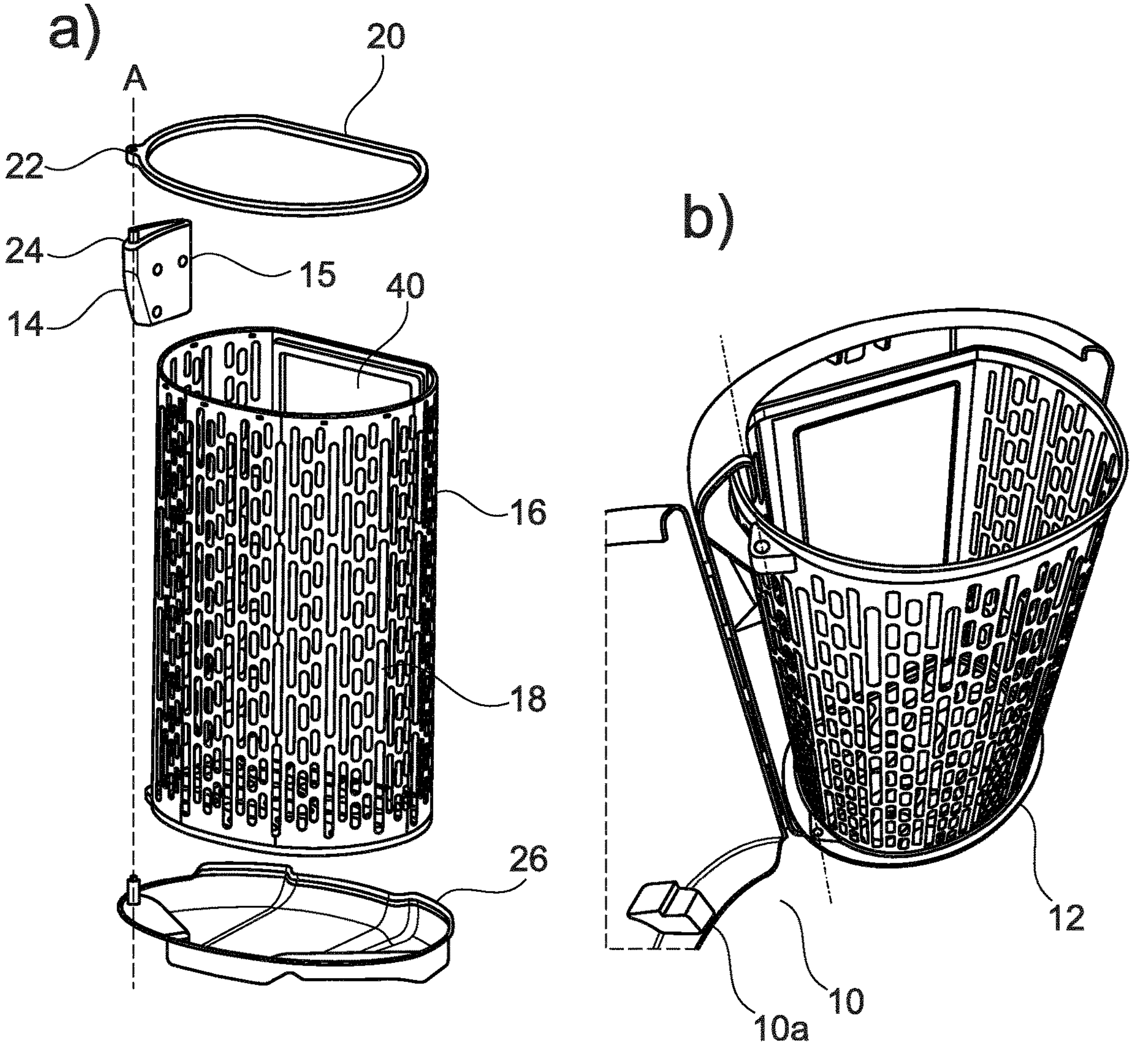
FIG. 1*a*) and b) show a waste basket (FIG. 1*a*)) and a waste bin fitted with such a waste basket (FIG. 1*b*)).

FIG. 1*a*) shows schematically a kit of parts according to an embodiment of the invention.

A receptacle 16 is provided that has the shape of a tube whose one end is closed and whose walls are penetrated by apertures 18. At one side face of the tube, a plate 40 is provided. The plate 40 retains the remaining part of a tubular outer wall of the receptacle 16 in the tubular shape.

There is furthermore provided at the open end of the waste receptacle 16 a ring 20 that is, in the present embodiment, to be arranged so as to surround the opening of the waste receptacle 16. This ring has a first engagement piece 22 which can be fitted with a corresponding second engagement piece 24 in the form of a protrusion that is provided on a hinge element 14. If the first and second engagement pieces 22, 24 are engaged with each other, the waste basket 12 made up of the waste receptacle 16 and the ring 20 can be swivelled around a horizontal axis A.

The hinge element 14 has provided therein holes 15 for screwing the hinge element to a waste bin. Provided underneath the waste receptacle 16 is a tray 26 that has the form of a shallow trough which can receive therein liquids that drip out of the waste receptacle 16.

FIG. 1*b*) shows how the assembled waste basket 12 is arranged inside a waste bin that, in the present embodiment, comprises a door 10*a* that has been opened to thereby allow for retrieving the waste basket 12.

Figure 2:
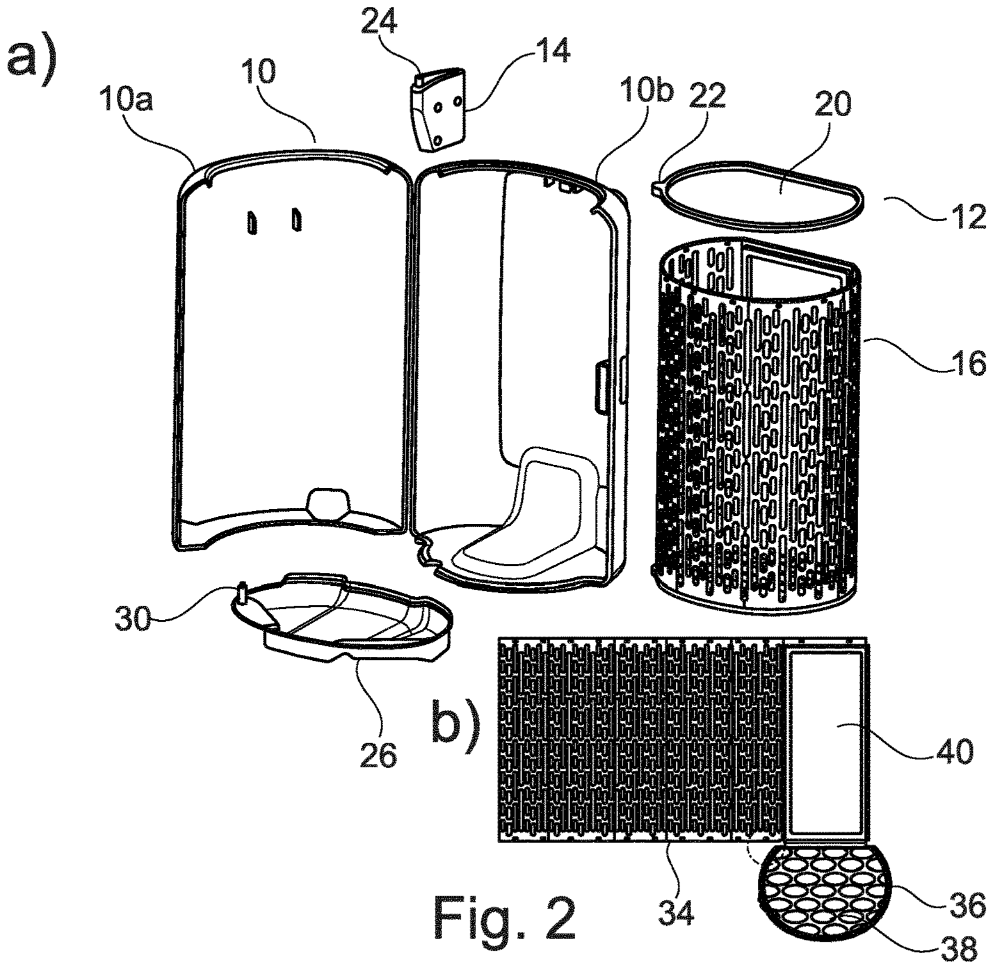
FIG. 2 shows an explosion diagram of a waste bin together with a kit of parts according to the invention. It furthermore shows the components of the waste receptacle.

FIG. 2 shows in more detail the components of the waste bin 10 according to the present invention.

A waste bin 10 comprises a fixed piece 10*b* and a door 10*a* that is hingedly attached to the fixed piece 10*b*. The hinge element 14 can be fixed (for example by screwing) to the fixed piece 10*b* of the waste bin. Onto the second engagement piece 24 of the hinge element 14, the first engagement piece 22 of the ring 20 can be engaged to thereby allow for a swivelling movement of the waste basket 12 out of the opened waste bin 10.

There is furthermore shown the tray 26 that is to be arranged in a bottom portion of the waste bin 10. The tray 26 comprises a fourth engagement piece 30 that is to engage with a third engagement piece 28 of the waste basket 12, which is to be discussed below. Whilst the waste basket 12 can be swivelled in and out of the waste bin 10, the tray 26 stays stationary within the waste bin 10.

Shown in the bottom of FIG. 2 are components of the waste receptacle 16. As can be seen from that figure, a plate 40 that is also suitable for being attached to a wall W is provided. This rectangular plate 40 has provided, along its long side, a sheet 34 that can be rolled up into a tubular form that can be brought into engagement with the respective other long side of the plate 40 to thereby hold the sheet 34 in a tubular form. Provided along one short edge of the plate 40 is a bottom element 36 having apertures 38 extending therethrough. The sidewall sheet 34 and the bottom element 36 are connected to the plate 40 by means of living hinges. However, other connection means are also envisaged.

Figure 3:
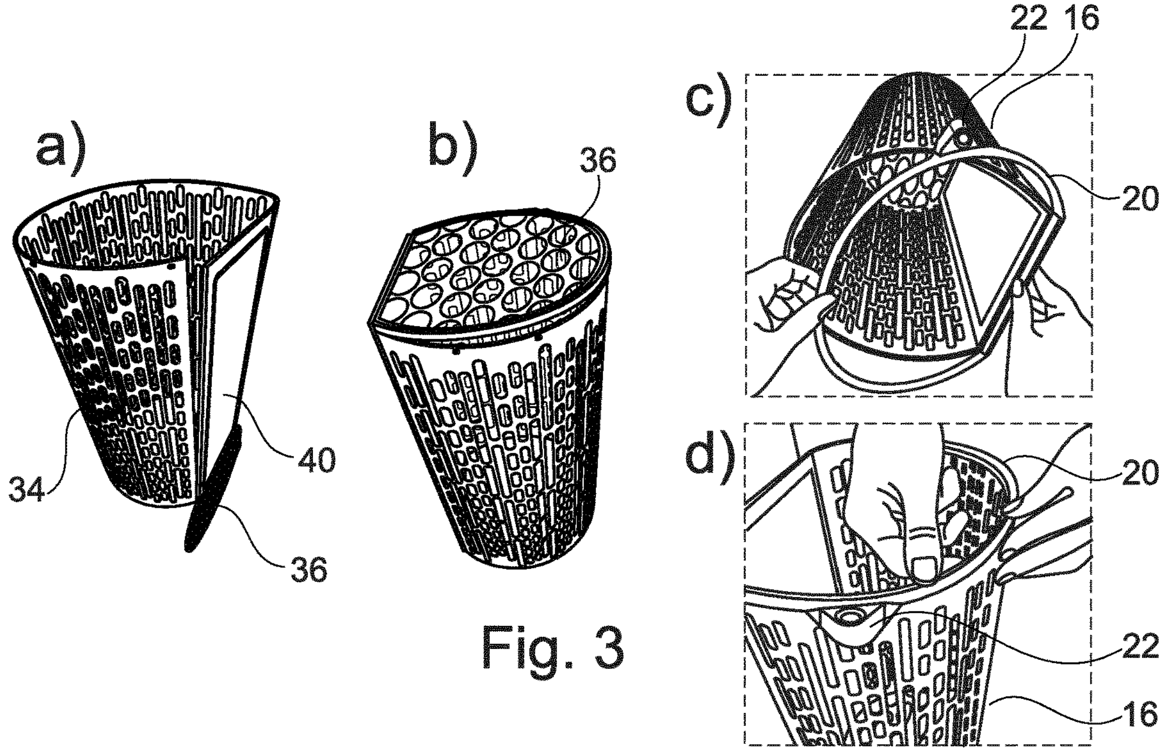
FIG. 3 shows steps in the assembly of the waste basket.

The process of assembling the waste receptacle 16 from the configuration shown in FIG. 2*b*) is illustrated in FIG. 3.

As can be seen from FIG. 3*a*), the sidewall sheet 34 is bent into a tubular form and the free (that is, non-connected to the plate 40) end of the sidewall sheet 34 is brought into engagement with the plate 40. In that engaged state, the sidewall sheet 34 is held in a tubular form.

Subsequently, the bottom element 36 is folded so as to close the tube. The rim of the bottom element 36 is brought into engagement with the edge of the bent sidewall sheet 34 to thereby hold the bottom element 36 in place and so as to further stabilise the bent sidewall sheet 34.

Subsequently, as shown in FIG. 3*c*), a ring 20 is arranged to as to surround the outer circumference of the open end of the waste receptacle 16. For example, the ring 20 can be slid onto the sidewall sheet 34 and the plate 40. This also stabilises the waste receptacle 16. The ring 20 furthermore provides a first engagement piece 22 that is used for engaging the waste basket 12 with the second engagement piece 24 that is provided as part of the hinge element 14 which will, in use, be fixed to the waste bin 10.

As is shown in FIG. 3*d*), the ring 20 is pushed in place, and care is taken to ensure that the ring 20 surrounds the entire circumference of the waste receptacle 16.

Figure 4:
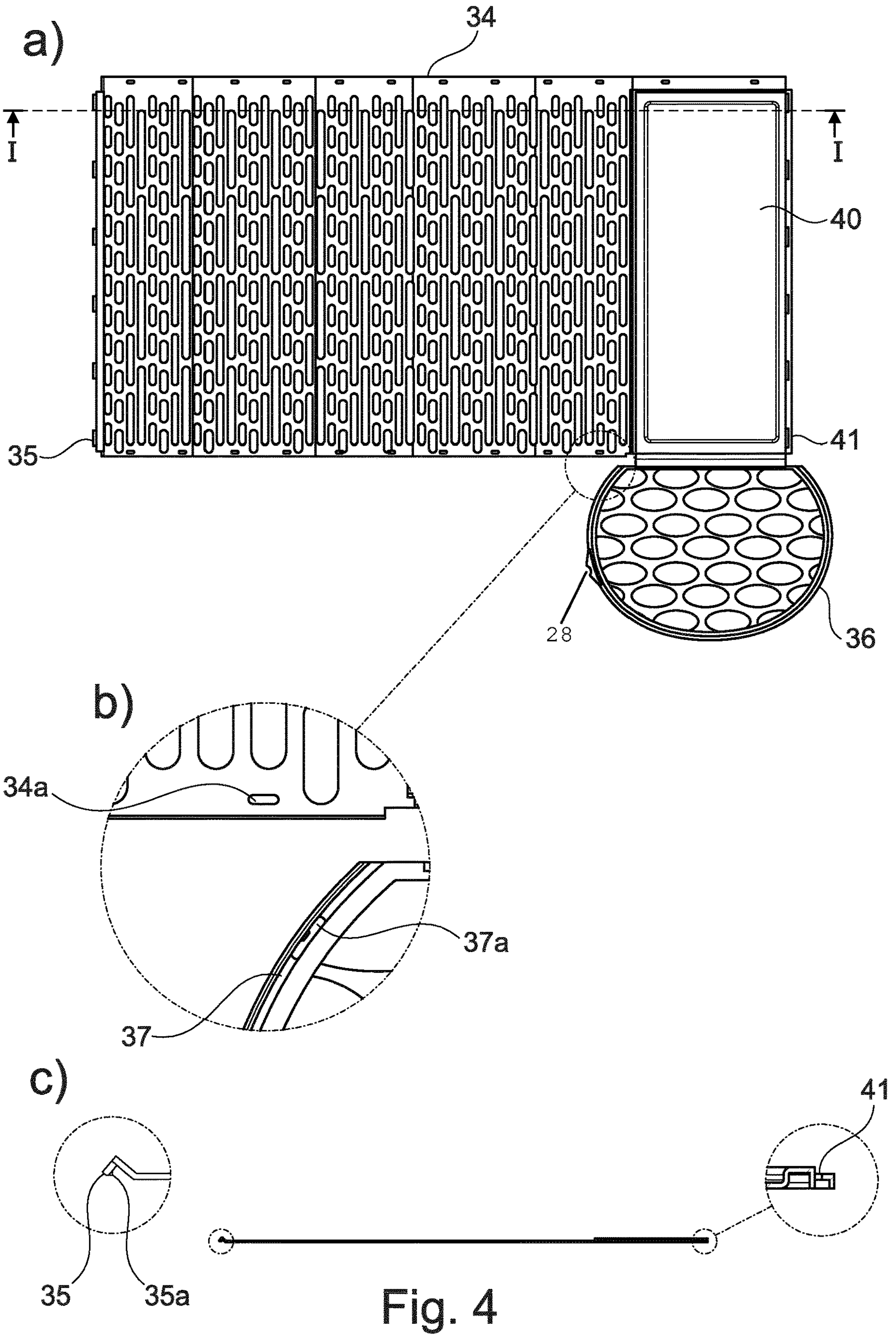
FIG. 4 shows details of the component depicted in FIG. 2*b*).

FIG. 4 shows details of the component depicted in FIG. 2*b*).

As can be seen from FIG. 4*a*), the plate 40 has provided, along the free long edge thereof, rectangular holes 41 that are arranged at intervals along the longitudinal side thereof and that penetrate through the sidewall sheet 34. At the respective free end of the sidewall sheet 34, hooks 35 are arranged at positions that correspond to the positions of the holes 41 and that can be introduced into those holes 41. The hooks 35 are arranged so that they snuggly fit into the holes 41 and will, by means of a protrusion 35*a*, be retained in those holes 41 so that this engagement between the hooks 35 and the holes 41 holds the sidewall sheet 34 in the tubular form.

In FIG. 4*c*), one can see a cross-sectional view of the structure shown in FIG. 4*a*) when viewed along the line I-I. In that drawing, the overall shape of the side wall sheet 34 can be seen more clearly, including the protrusions 35*a* provided on the hooks 35.

FIG. 4*b*) shows, in an enlarged form, the encircled region in FIG. 4*a*). As can be seen from that enlarged portion, the free end of bottom element 36 (that is, that part of the circumference of bottom element 36 that is not connected to the plate 40) has provided thereon a narrow recess 37 that runs along the circumferential outer edge of the bottom element 36. When the sidewall sheet 34 has been brought into a tubular form, the edge of the sidewall sheet 34 that is closest to the bottom element can be received within this recess 37. By means of notches 37*a* and recesses 34*a* provided in the recess 37 and the side wall sheet 34, respectively, which engage with one another, the bottom element 36 is held in the tubular form.

Figure 5:
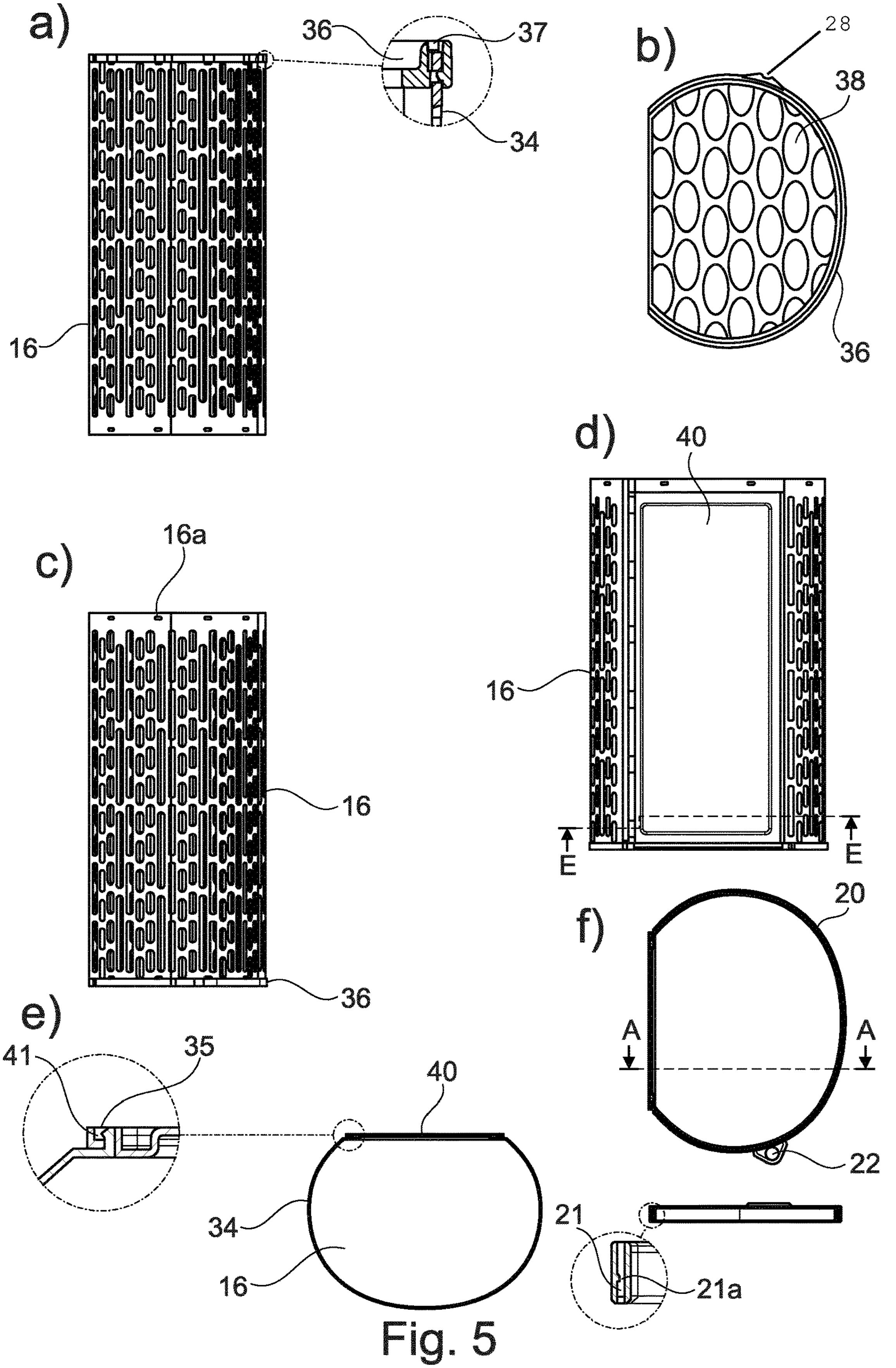
FIG. 5 shows details of the waste basket and of the ring used with it.

FIG. 5 shows the waste receptacle 16 in FIGS. 5*a*)-*e*) whilst FIG. 5*f*) shows the ring 20 that is to be fitted to the open end of the waste receptacle 16.

Starting with FIG. 5*a*), we see a side view of the waste receptacle 16 in the assembled form. As can be seen from that figure, in particular the insert, the side wall sheet 34 has been inserted with its free end into the recess 37 where it will be retained by the engagement between the protrusions 37*a* and the holes 34*a*.

FIG. 5*b*) shows a view of the bottom element 36 of the waste receptacle, where the apertures 38 can be clearly seen.

FIG. 5*c*) shows the waste receptacle 16 in the orientation in which it is fit for use, where the bottom element 36 is arranged at the bottom of the page. It is to be noted that, compared with FIG. 5*a*), the orientation of the waste receptacle 16 is inverted.

FIG. 5*d*) shows a view of the waste receptacle 16 where the plate 40 can be clearly seen.

The sectional view along the line E-E can be seen in FIG. 5*e*). As can be seen from that figure, the hooks 35 engage with openings 41 so as to retain the sidewall sheet 34 of the waste receptacle 16 in the tubular form.

FIG. 5*f*) shows the ring 20 that is to be used at the upper end of the waste receptacle 16 for forming the waste basket 12.

The cross-section along the dot-dashed line shown in FIG. 5*f*) is depicted at the bottom of FIG. 5*f*). As can be seen from that sub-figure, the ring 20 has a circumferentially extending recess 21 into which the upper end of the tubular wall of the waste receptacle 16 can be inserted. Provided on the inside of that recess 21 are protrusions 21*a* that engage with matching openings 16*a* that are provided on the upper end of the sidewall sheet 34 that is used for forming the waste receptacle 16 to thereby hold the ring 20 in place and that are shown in FIG. 5*c*).

Figure 6:
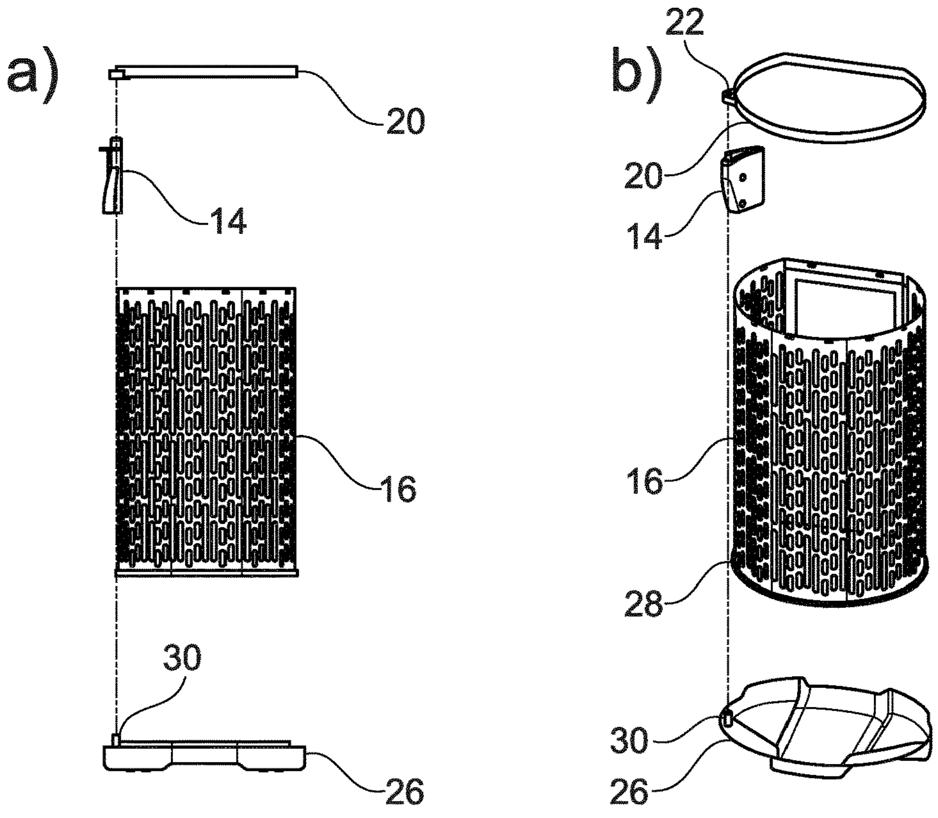
FIG. 6 shows components of the kit of parts according to the invention.

FIG. 6*a*) and b) show, in an exploded form, the components of the waste basket 12 as well as the hinge element 14. Starting at the top, a ring 20 is provided which can be engaged with the hinge element 14. The ring 20 is arranged so as to surround an open end of the waste receptacle 16. The waste receptacle 16 is closed at the bottom end. At that portion, it furthermore comprises a third engagement piece 28. This third engagement piece is brought into engagement with a fourth engagement piece 30 that is provided as part of a tray 26 which is arranged underneath the waste receptacle 16 so as to receive any liquid and/or small items that may drip or fall from the waste receptacle 16.

FIG. 7*a*) and b) show a waste bin 10 according to an embodiment of the invention where the door 10*a* has been opened. As can be seen from those drawings, the waste basket 12 has been arranged inside the waste bin 10, and the tray 26 has been arranged underneath the waste basket 12. In that configuration, the tray 26 will serve to collect liquid and/or small waste products that have fallen of the waste basket 12.

Figure 8:
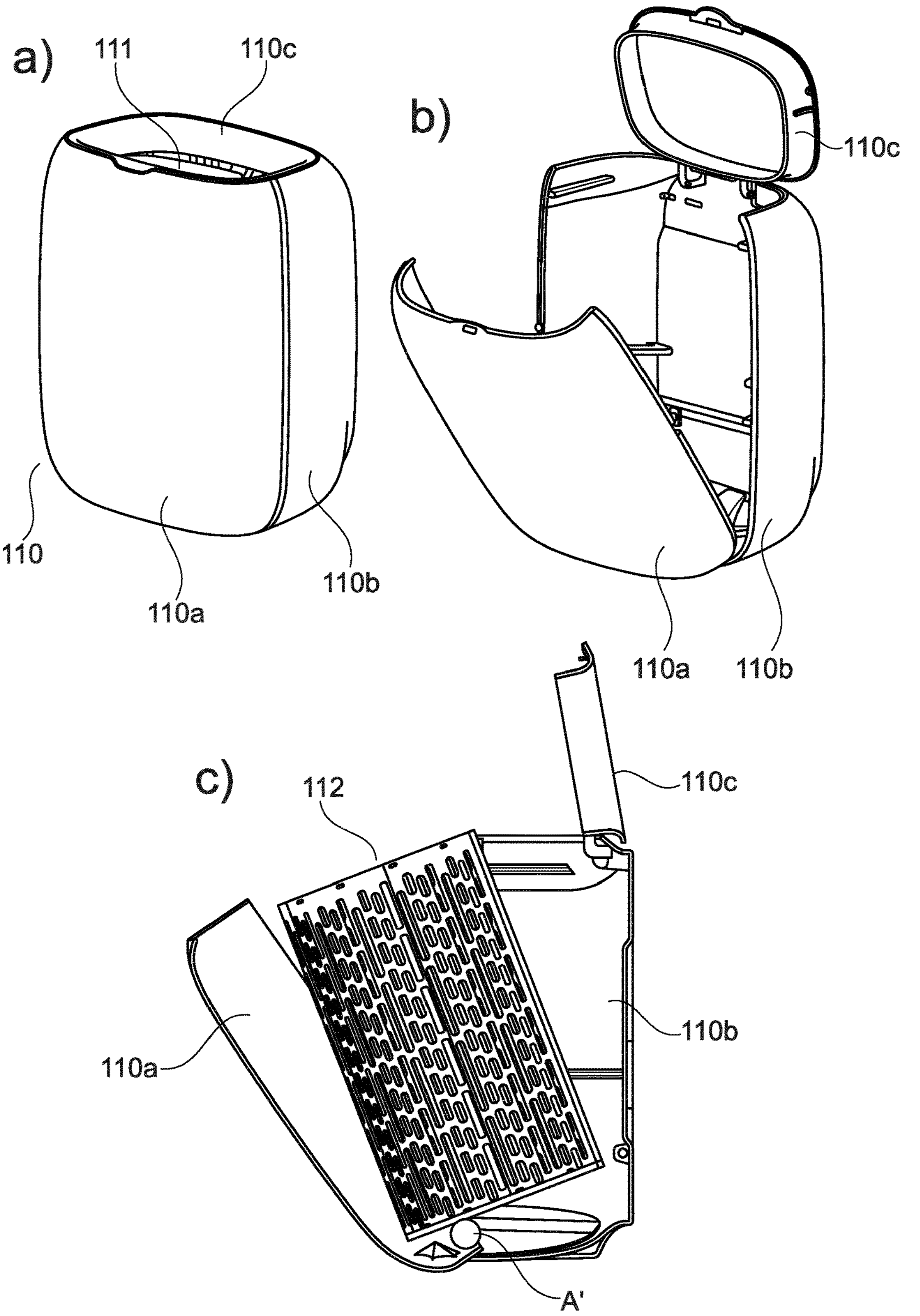
FIG. 8 shows that a different waste bin according to the invention fitted with a waste basket according to an embodiment of the invention.

FIGS. 8*a*)-c) show a waste bin 110 according to another embodiment of the invention.

Figure 7:
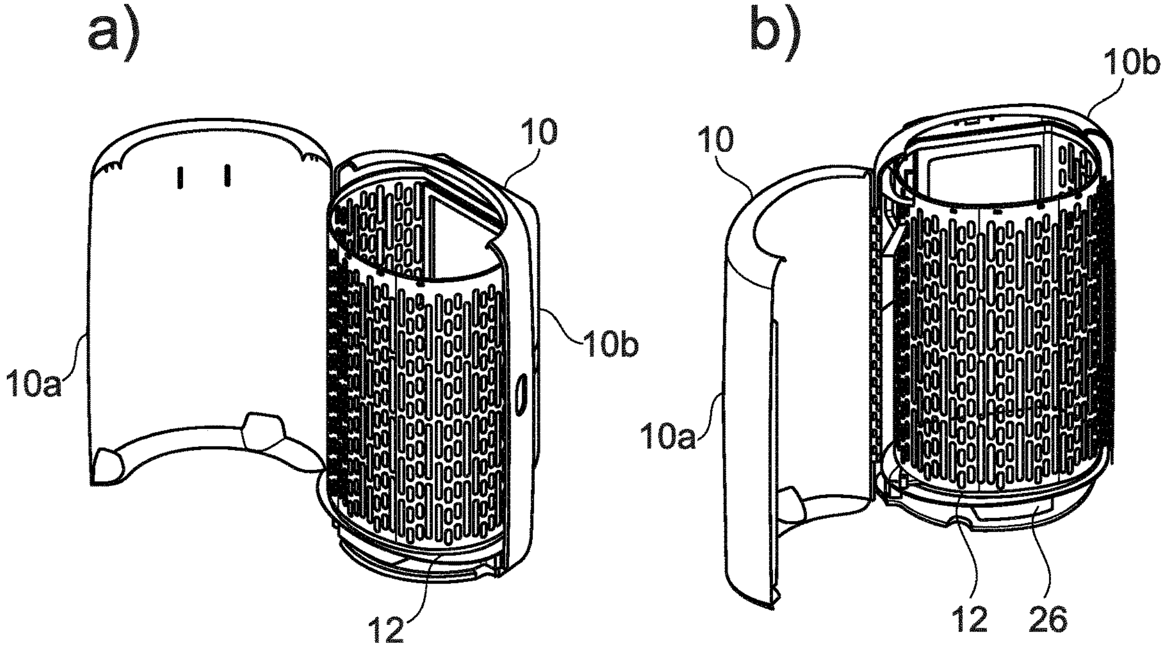
FIG. 7 shows the waste bin that is fitted with the waste basket according to an embodiment the invention.

Similarly to what is shown in FIG. 7, a waste bin 110 comprises a fixed piece 110*b* which has provided thereto, via a horizontal hinge, a door 110*a* that can be rotated outwardly around a horizontal axis provided at the front of the fixed piece 110*b*. Fixed piece 110*b* and door 110*a* enclose an opening 111 through which waste can be introduced into the waste bin 110. To guide the waste into the waste basket 112, a funnel-piece 110*c* is inserted into the opening 111. The inner surfaces of the funnel-piece 110*c* guide waste into a waste basket.

FIG. 8*b*) shows a configuration where the door 110*a* has been tilted about the horizontal axis and where the funnel-piece 110*c* has likewise being swivelled upwards. In that configuration, waste basket 112 becomes accessible to the outside, for example for the purpose of emptying it.

FIG. 8*c*) shows a configuration where a waste basket 112 has been introduced into the waste bin 110. The waste bin 112 is shown in a swivelled-forward configuration about a horizontal axis A'. In that configuration, it can be more easily emptied or retrieved by a person wishing to service the waste bin 110.

Figure 9:
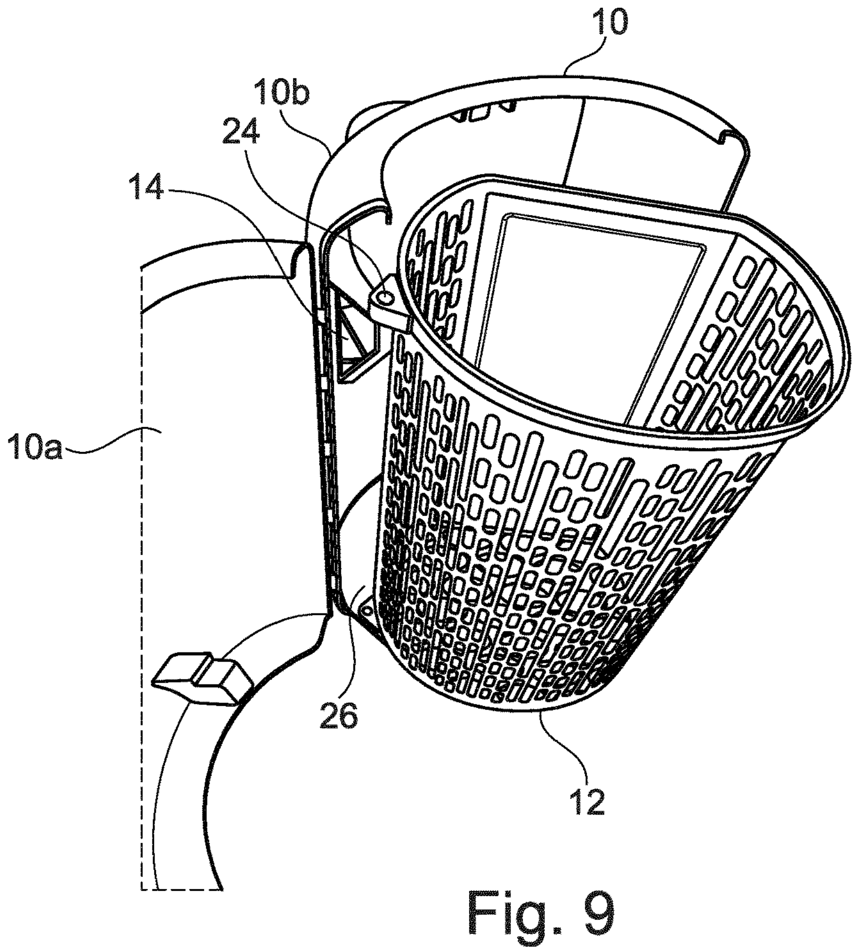
FIG. 9 shows steps of fitting the waste basket to a waste bin.

FIG. 9 shows how the waste basket 12 can be installed inside the waste bin 10. Since the front door 10*a* has been opened, the waste basket 12 can be brought into engagement with the second engagement piece 24 of the hinge element 14. It is furthermore brought into engagement with the fourth engagement piece 30 provided on the tray 26. Once the waste basket 12 has been fully installed inside the waste bin 10 can the door 10*a* be closed to improve the aesthetic appearance of the waste bin 10 and to protect the waste basket 12 from outside interference.

Figure 10:
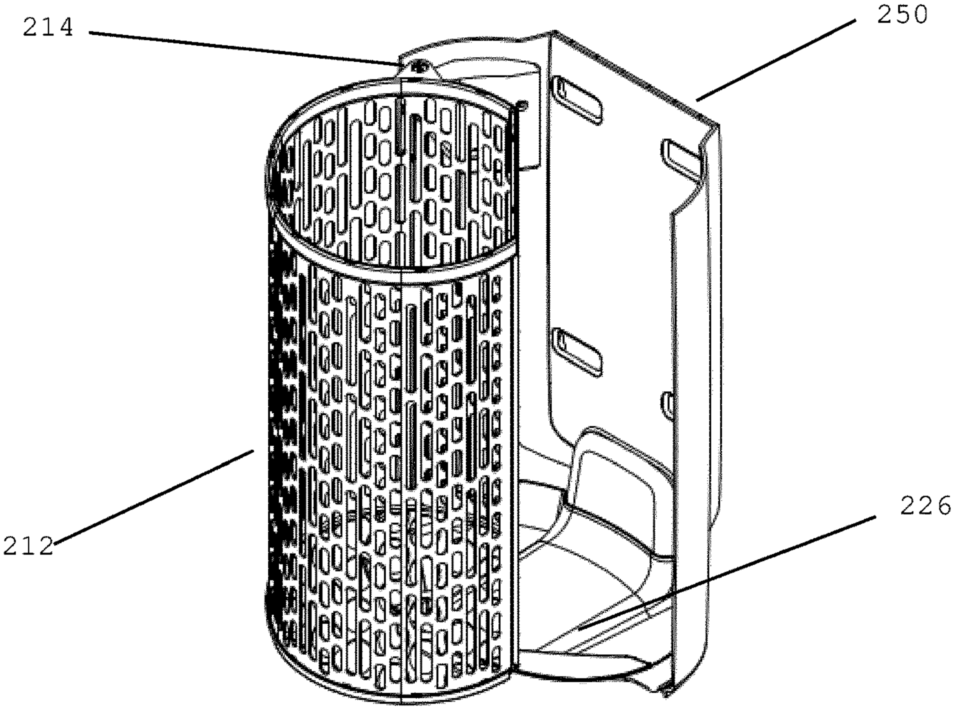
FIG. 10 shows a waste basket according to the invention that is fitted to a wall using a frame.

FIG. 10 shows a waste basket 212 according to an embodiment of the invention that is fitted to a wall. It is to be noted that the features of the waste basket 212 are identical to those discussed in relation to FIGS. 1-7 and 8, and reference numerals that are identical to those used in those figures (where 200 has been added) are being used to denote corresponding items. For the sake of conciseness, a detailed description has been omitted, and reference is made to the respective preceding paragraphs.

In order to attach the waste basket 212 to the wall, a frame 250 is attached to the wall (e.g. using screws). This frame 250 comprises a hinge element 214 which defines a vertical axis around which the waste basket 212 can be swivelled. The waste basket 212 may preferably be designed according to embodiments earlier described meaning it has a top ring 20 with a through hole that engages with the hinge element 214.

Underneath the waste basket 212, a tray 226 is arranged that is removably held by the frame 250. This tray 226 serves to catch any liquid or small objects falling out of the waste basket 212 in a manner analogous to that of tray 26 described previously. This tray 226 comprises a third engagement piece which is arranged vertically underneath hinge element 214 so as to provide the vertical axis around which the waste basket 212 can be swivelled. The waste basket 212 will then consequently have a third engagement piece in the bottom part as described by reference to the first embodiment as a third engagement piece 28 of the waste basket 12 (cf. FIGS. 4(*a*) and 5(*b*)).

The invention claimed is:

1. A kit of parts for fitting a waste bin with a waste basket, comprising:

a hinge element, the hinge element being arranged for being attached to the waste bin, a waste basket, the waste basket comprising a waste receptacle for retaining waste and a ring at least partially arranged along a periphery of an upper edge opening of the waste receptacle, the waste receptacle having apertures extending through a wall of the waste receptacle to allow for air to circulate between the inside and the outside of the waste receptacle, wherein the hinge element and the waste basket are arranged so that the waste basket is rotatably supported by the hinge element, the waste basket being rotatable relative to the waste bin between a first position in which the waste basket is aligned with an opening of the waste bin and a second position in which the waste basket is offset from the opening of the waste bin.

2. The kit of parts according to claim 1, wherein the ring (20) comprises a first engagement piece and the hinge element comprises a second engagement piece, the first and second engagement pieces being arranged so that they can be brought into releasable engagement with one another so as to allow the waste basket to be swivelled relative to the hinge element.

3. The kit of parts according to claim 2, wherein the first engagement piece comprises a recess or a through hole and the second engagement piece comprises a protrusion that can be brought into engagement with one another.

4. The kit of parts according to claim 1, wherein the hinge element and the waste basket are arranged to allow for a swivelling motion of the waste basket around a vertical axis (A).

5. The kit of parts according to claim 1, wherein the hinge element and the waste basket are arranged to allow for a swivelling motion of the waste basket around a horizontal axis (A').

6. Kit of parts according to claim 5, wherein the hinge element comprises a shaft element that is to be arranged in the waste bin, the waste basket comprising a recess that is arranged for receiving the shaft element so as to allow for the swivelling motion of the waste basket around the horizontal axis, the recess preferably being arranged in a bottom portion of the waste basket.

7. The kit of parts according to claim 1, further comprising a tray that is suitable for being arranged underneath the waste receptacle.

8. The kit of parts according to claim 7, wherein the waste basket further comprises a third engagement piece and the tray comprises a fourth engagement piece, the third and fourth engagement pieces being arranged for being brought into engagement with each other, wherein the engaged third and fourth engagement pieces are arranged to support and/or limit the swivelling movement of the waste basket about the hinge element.

9. A waste bin arrangement comprising a waste bin that is fitted with the kit according to claim 1, wherein the hinge element is attached to the waste bin and wherein the hinge element rotatably supports the waste basket.

10. The waste bin arrangement according to claim 9, wherein the kit of parts includes a tray that is suitable for being arranged underneath the waste receptacle, wherein the tray is removably held in the waste bin.

11. Waste bin arrangement according to claim 10, wherein the waste basket further comprises a third engagement piece and the tray comprises a fourth engagement piece, the third and fourth engagement pieces being arranged for being brought into engagement with each other, wherein the engaged third and fourth engagement pieces are arranged to support and/or limit the swivelling movement of the waste basket about the hinge element, wherein the third and fourth engagement pieces are engaged with one another.

12. A kit of parts for mounting a waste basket to a wall, comprising:

a frame arranged for attachment to a wall, the frame comprising a hinge element, a waste basket, the waste basket comprising a waste receptacle for retaining waste and a ring at least partially surrounding an opening of the waste receptacle, the waste receptacle having apertures extending through a wall of the waste receptacle to allow for air to circulate between the inside and the outside of the waste receptacle, wherein the hinge element and the waste basket are arranged so that the waste basket is rotatably supported by the hinge element, the waste basket being rotatable relative to the frame between a first position in which the waste basket is aligned with a bottom of the frame, and a second position in which the waste basket is offset from the bottom of the frame.

13. The kit of parts according to claim 12, wherein the ring comprises a first engagement piece and the hinge element comprises a second engagement piece, the first and second engagement pieces being arranged so that they can be brought into engagement with one another to thereby allow the waste basket to be swivelled relative to the hinge element.

14. The kit of parts according to claim 13, wherein the first engagement piece comprises a recess and the second engagement piece comprises a protrusion.

15. The kit of parts according to claim 12, wherein the hinge element and the waste basket are arranged to allow for a swivelling motion of the waste basket around a vertical axis.

16. The kit of parts according to claim 12, wherein the hinge element and the waste basket are arranged to allow for a swivelling motion of the waste basket around a horizontal axis (A').

17. The kit of parts according to claim 16, wherein the hinge element comprises a shaft element that is to be arranged in the frame, the waste basket comprising a recess that is arranged for receiving the shaft element so as to allow for the swivelling motion of the waste basket around the horizontal axis, the recess preferably being arranged in a bottom portion of the waste basket.

18. A method of making a waste basket suitable for use in a kit or waste bin arrangement according to one of the preceding claims, comprising the following steps:

providing a sidewall sheet having apertures extending therethrough, bending the sidewall sheet and forming a tube using the bent sidewall sheet as at least part of a sidewall of the tube, using a bottom element to close one end of the tube to thereby create a waste basket, wherein the bottom element includes a narrow recess proximate a circumferential outer edge of the bottom element and using the bottom element to close one end of the tube to thereby create a waste basket includes positioning an end of the sidewall sheet within the narrow recess of the bottom element and engaging a plurality of notches arranged within the narrow recess of the bottom element with a plurality of recesses formed at the sidewall sheet.

19. The method according to claim 18, wherein the bottom element comprises a sheet having apertures extending therethrough.

20. The method according to claim 18, wherein the step of forming the tube comprises the sub-step of additionally providing a wall plate that is engaged to edges of the sidewall sheet to thereby hold the sidewall sheet in a bent shape to thus form the tube.

21. The method according to claim 20, wherein the bottom element is provided as one component with the plate.

22. The method according to claim 18, further comprising attaching a ring to the open end of the tube so as to extend along the circumference of the tube.

* * * * *